United States Patent

Stewart

[15] 3,656,987
[45] Apr. 18, 1972

[54] ARTICLE FOR REINFORCING CLOTH
[72] Inventor: George W. Stewart, Waco, Tex.
[73] Assignee: A. B. Ellis, a part interest
[22] Filed: Jan. 30, 1970
[21] Appl. No.: 7,056

Related U.S. Application Data

[63] Continuation-in-part of Ser. No. 638,070, May 12, 1967, abandoned.

[52] U.S. Cl. .................................................117/3.4, 117/76 P
[51] Int. Cl. ..................................................................B41m 3/12
[58] Field of Search..................117/3.4, 76 P; 161/406 T; 156/249, 238

[56] References Cited

UNITED STATES PATENTS

| | | | |
|---|---|---|---|
| 2,603,618 | 7/1952 | Cagan et al. | 117/3.4 UX |
| 2,631,958 | 3/1953 | Francis | 117/3.4 UX |
| 3,235,395 | 2/1966 | Scharf | 117/3.1 X |
| 3,297,508 | 1/1967 | Jahp | 117/3.1 UX |
| 3,394,405 | 7/1968 | Conklin | 117/3.4 UX |

Primary Examiner—William D. Martin
Assistant Examiner—Harry J. Gwinnell
Attorney—Molinare, Allegretti, Newitt & Witcoff

[57] ABSTRACT

An article and method useful for providing a flexible, substantially transparent reinforcing layer for cloth material. The article has a flexible paper base, an intermediate release layer, a layer of thermosetting material coated on said release layer and an outer layer of vinyl material on the thermosetting layer. Upon application of heat to the uncoated side of the paper, the thermosetting and vinyl layers are released from the release layer and transferred as a reinforcing patch to cloth material. The process for making this article comprises applying a layer of thermosetting material to a silicone coated paper product, drying the thermosetting layer and coating the thermosetting layer with a vinyl material, and then partially curing the vinyl so that it may be later reactivated for transfer to the cloth material.

2 Claims, 4 Drawing Figures

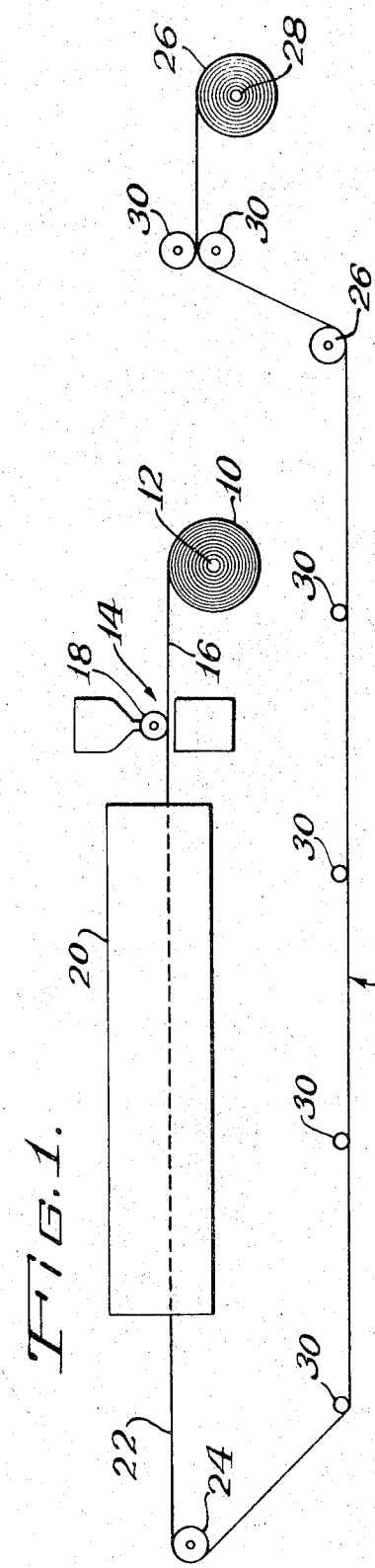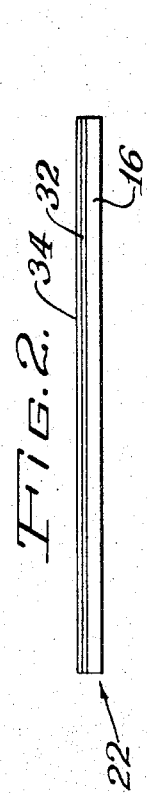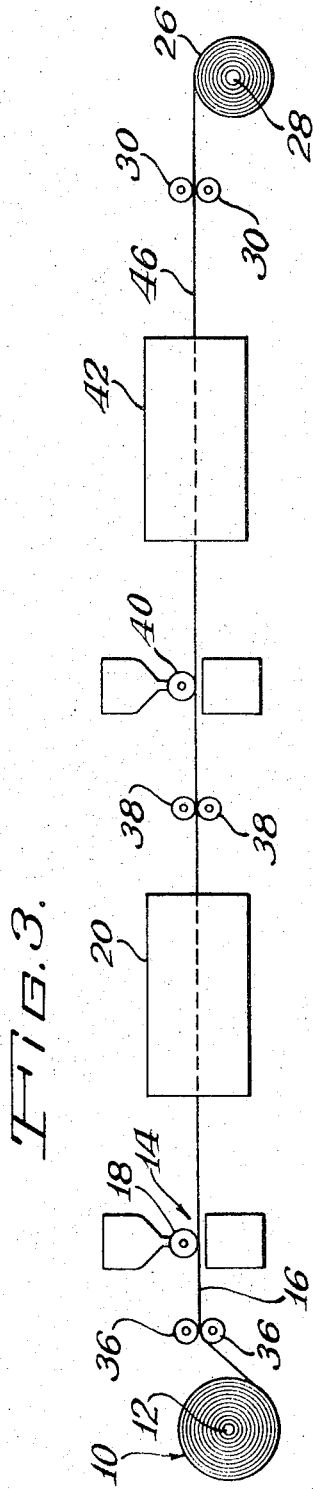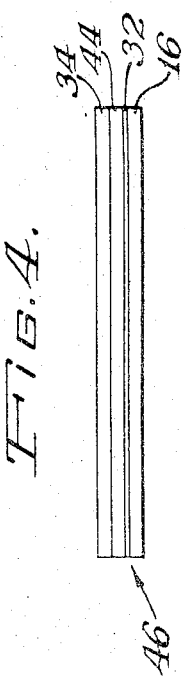

ARTICLE FOR REINFORCING CLOTH

CROSS REFERENCE TO RELATED APPLICATION

This application is a continuation-in-part of my co-pending application Ser. No. 638,070, filed May 12, 1967, entitled "Patch And Process For the Manufacture Thereof", now abandoned. The disclosure of said co-pending application is incorporated by reference herein in its entirety.

BACKGROUND OF THE INVENTION

This invention relates to an improved article useful for reinforcing areas of clothing with a plastic film, to a method for making such an article, and to a method for reinforcing a cloth material with such an article.

For many years, clothing, particularly work clothes and children's clothes, have been reinforced in the areas subject to hard wear, such as at the knees and elbows, by cloth patches bonded to the material by use of a suitable adhesive. Such patches have generally been applied to the inside surface of the area of high wear, such as inside of the knees of a pair of trousers, to provide the desired enhanced durability. These patches are applied to the clothes by the manufacturers by the use of special heat seal equipment, such as the type shown in U.S. Patent application Ser. No. 541,601, filed Apr. 11, 1966, now U.S. Pat. No. 3,454,741. It is to be understood that the patches which are the subject of this invention are not the type which are commercially available to repair worn clothing and which are applied by the use of hand irons at relatively low temperatures.

Since these patches have generally been applied only to work clothes and children's clothes, appearance has not been of great concern. However, with the advent of "wash and wear" type clothing and particularly permanently pressed clothing the need for providing reinforcement of areas of high wear on such clothing without adversely affecting appearance has greatly increased. Permanently pressed clothing in particular has a much shorter life than comparable untreated clothing, generally about 25 per cent less life. Thus, the demand for increasing the wearability of knees and elbows on such clothing results. The prior art cloth patches have not proven to be satisfactory since there cloth patches adversely affect appearance and feel which cannot be tolerated with most permanently pressed clothing or with most "wash and wear" clothing. In addition, the prior art patches are entirely unsatisfactory for reinforcement of pockets and other flat areas of clothing which are usually subject to hot irons and pressure during cleaning since such prior art patches tend to become sticky under the influence of heat and pressure.

It is therefore an object of this invention to provide a novel article useful for providing a reinforcing layer of material for high wear areas of clothing which substantially avoids the disadvantages of prior art products.

It is also an object of this invention to provide an improved article useful for application to area of high wear on clothing, including the permanently pressed type, for reinforcing purposes wherein the article provides a highly flexible reinforcing film of plastic which does not adversely affect the external appearance or feel of the clothing at the place of reinforcement.

It is another object of this invention to provide an improved article for providing a patch to a garment which is resistant to the heat and pressure normally encountered during the cleaning of the garment.

It is still another object of the invention to provide an improved article for providing a patch to a garment which can be cleaned and pressed by conventional cleaning and pressing methods without causing the surface of the patch to become sticky and gummy and to adhere to other parts of the garment.

It is a further important object of this invention to provide an improved process for making an article useful for reinforcing areas of clothing without adversely affecting external appearance.

Further purposes and objects of this invention will appear from a reading of the following description.

SUMMARY OF THE INVENTION

The product which is the subject of this invention generally comprises a flexible paper base having a thin intermediate layer of silicone or the like and with an outer layer of vinyl applied to the intermediate silicone layer, the vinyl layer having a releasing point preferably of about 350°–500° F. so that upon application of the required heat to the uncoated side of the paper, the vinyl layer is released from the silicone layer and is applied to the area of clothing which is to be reinforced.

The process for making the above paper article involves applying a thin layer of vinyl liquid to a silicone coated surface of flexible paper, at least partially curing the vinyl on the silicone surface at a temperature of about 325°–340° F., and then cooling the vinyl layer to room temperature before curing of the vinyl is completed.

In accordance with another embodiment of the present invention, there is provided an article which comprises a flexible paper base, an intermediate release layer, a thermosetting layer of material applied onto the intermediate release layer, and a layer of thermoplastic or vinyl material coated on top of the thermosetting layer. Upon application of heat and pressure to the uncoated side of the paper, the vinyl and thermosetting layers are released from the release layer and are applied to the area of clothing which is to be reinforced.

The process for making this embodying article of the invention involves applying a thin layer of a thermosetting material to a silicone coated surface of flexible paper, drying the thermosetting material, and then coating the thermosetting layer with a layer of a vinyl material. The vinyl coated article may then be pre-cured at a temperature of about 325°–340° F.

BRIEF DESCRIPTION OF THE DRAWINGS

FIG. 1 is a schematic representation of our process for preparing one embodiment of the invention which is a product having a heat releasable plastic layer useful for reinforcing areas of high wear of clothing;

FIG. 2 is a greatly enlarged cross-sectional view through an article made in accordance with the process shown in FIG. 1;

FIG. 3 is a schematic view of another process of the invention for preparing an improved product of the invention; and FIG. 4 is an enlarged cross-sectional view of an article made in accordance with the process illustrated in FIG. 3.

DESCRIPTION OF THE PREFERRED EMBODIMENTS

Referring to FIG. 1, there is schematically shown one method of making an improved reinforcing patch. A roll 10 of commercially available paper is rotatably mounted on a horizontal axis 12. It is important that the paper roll 10 includes a thin coating which permits the release of a plastic layer to b applied. The thin coating must have a melting point in excess of about 500° F. and is preferably a silicone material. The paper is flexible but sufficiently thick to provide the desired flexibility for the final product. The silicone coating is about 1 mil in thickness. The width of the roll is generally about 42 inches and weighs about 2½/2–3 ounces per linear yard. The silicone material which may be used in the present invention is known to those skilled in the art. I prefer to use a mixture of dimethyl polysiloxane, silica aerogel and solvent. Other silicon-containing materials which can be used are shown, for example, in U.S. Pat. Nos. 3,230,289 and 3,311,489.

After mounting the paper roll 10 with the silicone coating upon the axle 12, the forward end of the roll 10 is first fed past a coating station 14 where a thin layer of liquid plastic cloth reinforcing material, preferably vinyl, is applied to the silicone coated surface of the paper strip 16. The coating of liquid vinyl is applied to the paper in any suitable way, as by roller coating or by knife coating; in the embodiment of FIG. 1, a roller 18 is used to apply vinyl liquid. The vinyl must be coated on the silicone surface of the paper 16 so that it can be later released. The liquid vinyl is applied in a thickness of about 7½ mils at the coating station 14; the vinyl at this liquid thickness after curing, has a thickness of about 4¼ mils, dry weight.

After the vinyl coating has been applied to the silicone coated surface of the paper, the coated paper product is passed through an oven 20 so as to at least partially cure the liquid vinyl on the paper 16. The temperature at which the vinyl is cured is quite critical. The vinyl coating is actually only partially cured so that heat later applied to the paper product at higher temperature will rapidly melt the vinyl, release it from the silicone coated paper, and substantially completely cure the vinyl at the higher temperature as it is applied to the cloth material to be reinforced. For practical purposes, the vinyl is partially cured at a temperature of 325°–340° F. so that it can be later completely cured at temperatures no higher than about 500° F.

The vinyl is partially cured by passing the vinyl coated silicone paper through an oven at the desired curing temperature for a sufficient period of time to solidify the vinyl while drying it. Although the curing time is generally about 1–4 minutes, the actual time depends particularly on the relative humidity of the atmosphere; the higher that the relative humidity is, the longer is the time required for the partial cure. Preferably the vinyl layer is partially cured for about 1½ to 2½ minutes. In the actual example shown in FIG. 1., the paper travels continuously through the oven at the speed of about 30–40 feet per minute. The oven 20 may vary in length but I use an oven about 60 feet in length. After the passing from the oven, the vinyl is cooled to air temperature so as to avoid tackiness of the vinyl coating on the paper before the product 22 is rerolled into a storage roll. In FIG. 1, a reversing roller 24 is positioned just after passing the paper through the oven 20 and the cured product is passed to a take-up roller 26 near the start roller 10. The take-up roller 26 is mounted upon an axle 28 which may be connected to a motor (not shown for driving the paper web through the oven 20. The lead end of the paper on the roll 10 may be manually fed through the oven until it is attached to the driven take-up roller 26 which automatically pulls the paper to be coated through the oven. After passing from the oven the coated and cured paper 22 passes around a reversing roller 24 and the series of guide rollers 30 guide the movement of the coated web 22 to the take-up roller 26. During the movement to the take-up roller 26, the vinyl coating is cooled to room temperature so that the vinyl is dried sufficiently to permit the vinyl coated web 22 to be taken up in the roll 26.

Alternatively to air cooling of the web 22, a cooling chamber (not shown) may be located at the end of the oven 20 to cool the vinyl coating to the desired point. If such a cooling chamber is used, it is not necessary to air cool the web 22, and the take-up roller 26 may be positioned adjacent the outlet of the oven 20.

After the vinyl coated web 22 is rolled on a take-up roll 26, the paper rolls 26 are further processed by being cut into individual patches of a desired size for ultimate application to clothing.

The material, preferably vinyl, which is applied to the silicone layer of the paper product is preferably type E 9190 P manufactured by Pierce & Stevens Company of Chicago, Illinois. This vinyl material has been used in the past for bonding the old cloth patches to clothing, and it is principally vinyl chloride copolymer with plasticizer and solvent. This liquid vinyl may be partially cured at 325°–340° F. The ideal temperature for reactivation of the vinyl reinforcing material is about 375°–400° F. The time required for reactivation is about 5–10 seconds at the desired temperature.

Referring to FIG. 2, the paper product 22 which is the subject of this invention is shown in a greatly enlarged sectional view. The lower surface is paper 16, the intermediate layer is the silicone layer 32, and the outer layer is the vinyl layer 34. As previously mentioned, heat is applied to the uncoated side of the paper 16 so that the proper temperature is transferred to the vinyl layer 34 to permit its release from the silicone layer 32.

Referring to FIG. 3, there is schematically shown one method of making another improved reinforcing patch. A roll 10 of commercially available paper is rotatably mounted on a horizontal axis 12. As shown, the roll of paper 10 was precoated with a thin coating of a release material which permits the release of a plastic layer therefrom. The thin release coating must have a melting point in excess of the temperature used in the transfer and final curing of the plastic material which is normally about 500° F. Again, I prefer to use a silicone material as the release coating, and such materials are known to those skilled in this art. The silicone coating is about 1 mil in thickness.

After mounting the paper roll 10 with the silicon coating upon the axle 12, the forward end of the paper passes through a pair of guide rollers 36 and then a coating station 14 where a thin layer of a thermosetting material is applied to the silicone coated surface of the paper strip 16. The coating of thermosetting material is applied to the paper in any suitable way, as by roller coating or by knife coating; in the embodiment of FIG. 3, a roller 18 is used. The thermosetting material must be coated on the silicone surface of the paper 16 so that it can be later released. As the thermosetting material, I prefer to use a varnish based material and I prefer to apply it at a rate of about 5 pounds per 1,000 square feet of paper base. Such varnish based thermosetting materials are known to those skilled in the art and they usually comprise a synthetic resin in a solvent or vehicle with other additives mixed therein. After the thermosetting material is dried in oven 20. When a varnish based material is used as the thermosetting material it may be dried at a temperature of about 550° F. for about 2–4 seconds, preferably about 3 seconds. The coated thermosetting layer is dried but not cured in oven 20.

As indicated above, after the thermosetting material has been applied to the silicone coated surface of the paper, the coated paper product is passed through an oven 20 so as to dry the thermosetting material on the paper 16. Thereafter, the dried and coated paper product is passed through guide rollers 38 and coating means 40 for applying the vinyl material onto the dried thermosetting material. The vinyl coated paper is then passed through oven 42, guide rollers 30 and wound up onto take-up roll 26.

It is to be understood that in the embodiment of the process shown in FIG. 3, the procedure is similar to that shown in FIG. 1 except that additional steps for coating and drying a thermosetting material is included.

From the foregoing, it is seen that I have provided an improved product for reinforcing areas of high wear on clothing. The vinyl reinforcing material is normally a clear material which has little if any adverse effect on the feel and appearance of the treated clothing. The vinyl coating has practically no external appearance and this is completely different from the prior art cloth patches which were clearly apparent from the outside and added a thickness of material so that the feel of the cloth was different in the areas of reinforcement. Thus, I have surprisingly provided a product for reinforcing cloth by combining a known silicone coated paper product with a known vinyl substance having important advantages over prior art cloth patches.

The improved product of the present invention, as illustrated in FIG. 4 herein, is particularly suitable for reinforcing any type of clothes or garment. This is due to the fact that when the article of FIG. 4 is applied to a garment the vinyl layer 34 is positioned immediately adjacent the garment with the thermosetting layer 44 on top thereof. Thus, the thermoplastic or vinyl layer is not exposed but is protected by the thermosetting layer. The protection afforded by the thermosetting layer is of great importance both during the manufacturing process of a patched garment and in its subsequent cleaning and pressing steps. When a patch is to be applied to a permanent press type of garment, such as at the knee areas thereof, the patch is first affixed to the garment and a permanent crease is then provided the garment, which usually runs through the patched area. When a permanent crease is put on a pair of trousers with a patch at its knee area, heat and pressure is applied to the trousers with a fold so that the patched area is folded and the exposed surface of the patch will be pressed against itself. When using the prior art patches, the folded patches frequently stick to themselves during the permanent creasing step, and the two folded portions of the patch have to be separated by mechanical means thereafter. When the improved patch of the present invention is used, the thermosetting layer, being the exposed layer after the patch has been applied to a garment, will be folded and come into contact with itself but it will not stick together.

Essentially the same advantages, as explained above, are obtained when the patched garment is cleaned and pressed by conventional methods. Again, the exposed layer, of the patch is relatively unaffected by heat, pressure, and solvents. Therefore, the patch will not become sticky or gummy and adhere to itself or to unintended portions of the garment.

The invention has been described in detail with particular reference to preferred embodiments thereof, and it will be understood that variations and modifications within the spirit and scope of the invention can be made by those skilled in the art.

What is claimed is:

1. In an article for reinforcing areas of cloth material wherein said article is of the type which includes a flexible sheet base material having a thin release coating thereon, and an outermost layer of a flexible cloth reinforcing thermoplastic material over said release coating, said thermoplastic layer being at a condition which provides for a later release thereof from said base sheet upon the heating of said thermoplastic layer to a selected temperature and into reinforcing relationship with one side of said cloth material without adversely effecting the external appearance or feel of the other side of said cloth material, the improvement comprising a continuous layer of a flexible thermosetting material in contact with and between said release coating and said thermoplastic material, said thermosetting material being capable of being released from said release layer simultaneously with the release of said thermoplastic layer upon application by said heating step, said thermosetting material thereafter becoming the outer covering layer for said thermoplastic material as said thermoplastic material reinforces said cloth material, and said outer thermosetting layer avoiding portions of its own outer surface sticking together when said outer surface portions are folded into contacting relationship with each other after application of said thermoplastic layer to said cloth material.

2. The article of claim 1 wherein said thermosetting material is a varnish base material of synthetic resin.

* * * * *